Nov. 19, 1940.                R. F. PARSONS                2,222,087
                    METHOD FOR TREATING COMESTIBLES
                         Filed May 4, 1939
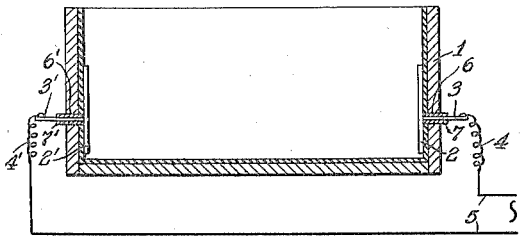
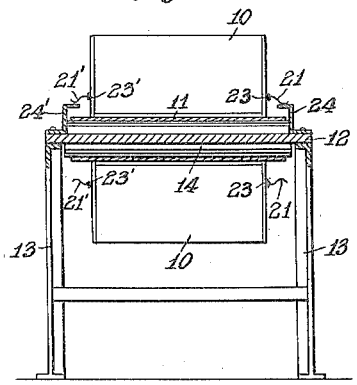
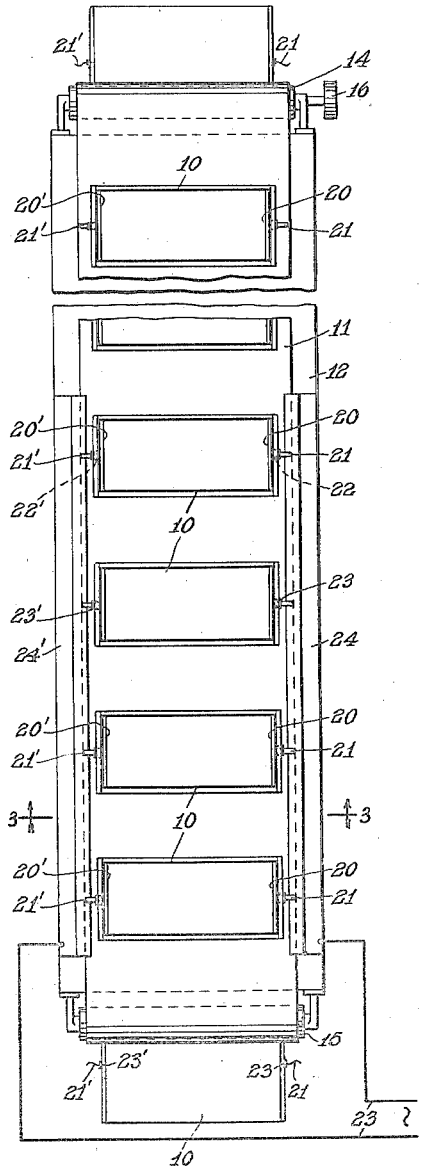
INVENTOR.
RICHARD F. PARSONS
BY WM. S. Pritchard
ATTORNEY.

Patented Nov. 19, 1940

2,222,087

UNITED STATES PATENT OFFICE 2,222,087

METHOD FOR TREATING COMESTIBLES

Richard F. Parsons, St. John's, Newfoundland, asssignor of one-half to Harvey & Company, Limited, St. John's, Newfoundland, a body corporate Application May 4, 1939, Serial No. 271,742

6 Claims. (Cl. 99—195)

This invention relates to comestibles and more particularly to treating comestibles having a cellular structure, and particularly flesh foods, such as fish, meat, poultry, etc.

Comestibles, and particularly fish, have been preserved by freezing and storage under low temperature conditions. When fish was frozen by slow freezing processes, ice crystals were produced. These crystals, the size of which varied on the time employed in the freezing operation, ruptured the delicate cell membranes of the fish. As a consequence, the fish both during storage and defrosting lost a considerable portion of its juice and flavor. Furthermore, when the frozen fish was stored at low temperatures for a protracted period of time, there were produced certain other undesirable effects, such as hardening of fiber and considerable dehydration.

Attempts were made to overcome the undesirable results secured in the slow freezing process by utilizing quick freezing processes. Though in the quick freezing processes the size of the ice crystals initially produced thereby was considerably smaller than those obtained in the slow freezing processes, nevertheless, after prolonged storage at low temperatures the quick frozen product exhibited a decided tendency to lose juice as well as a hardening of the fibers and considerable dehydration.

I have found that if the cellular structure of the comestible is not broken or ruptured, the undesirable effects of the previously mentioned processes can be overcome.

It is therefore an object of this invention to provide a frozen comestible in which the cellular structure is not broken down.

A further object of this invention is to provide a process of freezing comestibles wherein the breakdown in cellular structure of the comestibles is inhibited and prevented.

Other objects will become apparent from the following description, appended claims and accompanying drawing forming a part of this specification and wherein Figure 1 is a vertical section of one form of the apparatus employed in this invention;

Figure 2 is a top view of another form of the apparatus; and

Figure 3 is a section taken on the line 3—3 of Figure 2.

For the sake of brevity and convenience, a specific illustrative embodiment of the invention as applied to fish fillets will be described. It is to be understood, however, that the invention is not restricted to the specific embodiment described, since the principles of the invention are equally applicable to all comestibles having cellular structures, particularly flesh foods, and which are to be preserved by freezing.

In accordance with the principles of this invention, a fish fillet is subjected to a treatment prior to freezing which will inhibit or prevent the breakdown or rupture of the cellular structure of the fillet during the subsequent freezing thereof. After the fillet has been subjected to the preliminary treatment, the fillet is frozen by any of the known freezing processes, it being immaterial whether a slow or quick freezing process is utilized.

The preliminary treatment consists in subjecting the fillet to the action of an electric current. In other words, an electric current is passed through the fillet, and the latter thereafter is frozen. At the moment, I am unable to give any explanation of the action of the electric current on the fillet. My experiments have shown that when a fillet is subjected to an electric current and thereafter frozen, either by a slow or quick freezing process, there is produced a frozen product in which the cell structure is not broken down or ruptured. My experiments further show that the preliminary treatment prevents the formation of ice crystals in large sizes when the fillet is frozen, and likewise inhibits the deterioration of the frozen product when stored under low temperature conditions.

Though the fillet may be subjected to the electric current without any previous treatment, I have found that best results are secured when the fillet is treated with a solution which increases the conductivity thereof. Specifically I have found that best results are secured when the fish fillet is treated with a solution constituting an electrolyte prior to the passage of the electric current therethrough. Any electrolyte which does not deleteriously affect the fillet and which is not toxic to the human system may be utilized. It is therefore obvious that many electrolytes can be used. The preferred electrolyte is a saline solution and specifically an aqueous solution of sodium chloride.

In the preferred embodiment of the invention the saline substance is dissolved in water and the resulting solution applied to the fillet in any suitable manner, and preferably by immersing or dipping the fillet in the saline solution. Various concentrations of the saline substance in solution may be used. Optimum results have been obtained when an aqueous sodium chloride solution having a 12% salometer reading is used.

The electric current which is passed through the fillet is preferably of the alternating current type. The time of treatment with the electric current depends on the size of the fillet and also the voltage. In the case of fish fillets, I have found that when an alternating current of 220 volts is used, the time of treatment may be from 1 to 2 minutes.

The process hereinbefore described, and particularly the preliminary treatment, inhibits and prevents the formation of large size ice crystals when the comestible is subsequently frozen, with the result that the cellular structure of the product is not ruptured or broken down even when a slow freezing process is used. The process also has the effect of preventing the deterioration of the frozen product when stored under conditions of low temperatures.

In the drawing there is illustrated an illustrative embodiment of an apparatus suitable for the passage of an electric current through the comestible to be frozen.

Referring now to the drawing wherein like reference numerals designate like parts, the reference numeral 1 designates a box open at the top and provided at two opposite sides on the interior thereof with electrodes 2 and 2' carrying contacts 3 and 3', respectively. The contacts 3 and 3' are designed to extend exteriorly of the box and engage or be connected to electrical conductors 4 and 4', respectively, the latter being appropriately connected to a source of power 5.

To permit the contacts 3 and 3' to extend exteriorly of the box, the latter is provided with apertures 6 and 6' through which the respective contact passes. The apertures 6 and 6' are insulated by means of sleeves 7 and 7', respectively, formed of any suitable insulating material. It is to be noted that each of the insulating sleeves 7 and 7' project beyond the box. This is to guard against any possible short circuit which might occur because of the dripping of any electrolyte on the exterior of the box.

The box 1, hereinbefore described, is formed of a non-conducting material, such as Bakelite, rubber, etc. In some cases, for example when the box is formed of wood or other material having similar characteristics, it is advantageous to line the interior of the box with an insulating material. Thus, in accordance with this invention, when the box 1 is formed of wood or the like, it is provided with an insulating lining 8 on the interior thereof and the electrodes 2 and 2' are positioned thereon.

In the embodiments just described the electric current will pass from the source of supply 5, through the conductor 4, the contact 3, the electrode 2, through the comestibles in the box, and complete the circuit by passing through the electrode 2', the contact 3', and the conductor 4'. Suitable automatically acting switches (not shown) may be inserted in the circuit to control the length of time the current is desired to pass.

In the apparatus immediately hereinbefore described, the boxes are stationary. However, the invention may be utilized in connection with the boxes which are in motion. With this in view, a plurality of insulated boxes 10 are suitably arranged in series and secured to an endless travelling non-conductive belt 11, which is adapted to pass over and under a table 12 having supporting legs 13. The belt 11 traverses the rollers 14 and 15 positioned adjacent the opposite ends of the table. Either of the rollers, for example, the roller 14, may be appropriately connected to a driving mechanism whereby the belt will be driven. In the form shown, the roller 14 is provided with a pulley 16 which is driven by any suitable driving mechanism.

Each of the boxes 10 is of a construction generally similar to the box 1 previously described. Each box, with or without an interior insulating lining, depending on the material of which said box is made, is provided with electrodes 20 and 20' on two opposite sides in the interior of said box. The electrodes 20 and 20' carry brushes 21 and 21', respectively, which extend exteriorly of the box through apertures 22 and 22' which are insulated by sleeves 23 and 23' (similar to the sleeves 7 and 7' previously described). The brushes 21 and 21' are adapted to slidably and frictionally engage the rails 24 and 24' carried by the table 12. The rails 24 and 24' are connected to a suitable source of current 25 and constitute conductors.

The boxes 10 may be positively secured to the belt 11 in any suitable manner. When such a construction is utilized, the comestibles will be dropped by gravity from the box as the belt makes its return travel beneath the table. Each box will be supplied with the comestibles at the beginning of its movement across the top of the table. It is, of course, to be understood that the boxes need not be positively secured to the belts. If desired, the boxes may be appropriately positioned on the belt so that they will travel with the belt. In this construction the boxes will be manually disposed and removed from the belt at the respective positions therefor.

In the embodiment utilizing a travelling belt, the product to be frozen is placed in the boxes 10. As the belt travels, the boxes move therewith and at the appropriate time the brushes 21 and 21' of each box progressively and frictionally engage and slidably contact the rails 24 and 24', respectively. The current then passes through the thus-formed circuit which includes the comestibles in the boxes.

It is to be noted that the rails 24 and 24' are of a length sufficient to permit the current to pass through the comestibles for the desired period of time. In the form shown, the rails 24 and 24' are disposed adjacent the longitudinal edges of the table and intermediate the ends thereof.

Since it is obvious that various changes and modifications may be made in the above description without departing from the nature or spirit thereof, this invention is not restricted thereto except as set forth in the appended claims.

I claim:

1. A method of freezing comestibles which comprises passing an electric current through the comestibles to inhibit the rupture or breakdown of the cellular structure thereof during freezing, and thereafter freezing the thus-treated comestibles.

2. A method of freezing comestibles which comprises treating the comestibles with an aqueous saline solution, subjecting said comestibles to the action of an electric current to inhibit the rupture or breakdown of the cellular structure thereof during freezing, and thereafter freezing the thus-treated comestibles.

3. A method of freezing comestibles which comprises dipping the comestibles in an aqueous sodium chloride solution having a 12% salometer reading, passing alternating electric current of 220 volts through said comestibles to inhibit the rupture or breakdown of the cellular structure thereof during freezing, and thereafter freezing the thus-treated comestibles.

4. A method of freezing fish which comprises passing an electric current through the fish to inhibit the rupture or breakdown of the cellular structure thereof during freezing, and thereafter freezing said fish.

5. A method of freezing fish which comprises treating the fish with an aqueous saline solution, subjecting said fish to the action of an electric current to inhibit the rupture or breakdown of the cellular structure thereof during freezing, and thereafter freezing said fish.

6. A method of freezing fish which comprises dipping the fish in an aqueous sodium chloride solution having a 12% salometer reading, passing alternating electric current of 220 volts through said fish for approximately 1 to 2 minutes to inhibit the rupture or breakdown of the cellular structure thereof during freezing, and finally freezing said fish.

RICHARD F. PARSONS.